US007737106B2

(12) United States Patent
Kenneally et al.

(10) Patent No.: US 7,737,106 B2
(45) Date of Patent: Jun. 15, 2010

(54) PROCESS FOR MAKING AN IONIC LIQUID COMPRISING ION ACTIVES

(75) Inventors: Corey James Kenneally, Mason, OH (US); Stacie Ellen Hecht, West Chester, OH (US); Scott Leroy Cron, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 425 days.

(21) Appl. No.: 11/599,546

(22) Filed: Nov. 14, 2006

(65) Prior Publication Data

US 2007/0123446 A1 May 31, 2007

Related U.S. Application Data

(60) Provisional application No. 60/740,513, filed on Nov. 29, 2005.

(51) Int. Cl.
*C11D 1/00* (2006.01)
*C11D 10/00* (2006.01)
*B01D 12/00* (2006.01)
*B01F 17/00* (2006.01)

(52) U.S. Cl. ....................... 510/536; 510/537; 510/405; 510/179; 510/320; 516/198; 516/200; 516/203; 429/101; 429/102; 429/188; 429/324; 252/183.11; 252/183.13

(58) Field of Classification Search ................. 510/405, 510/179, 320, 535, 536, 537; 252/364, 183.11, 252/183.13; 554/1; 502/164, 224; 429/101, 429/102, 188, 324; 516/198, 200, 201, 203
See application file for complete search history.

(56) References Cited

U.S. PATENT DOCUMENTS

| | | | | |
|---|---|---|---|---|
| 5,039,451 | A * | 8/1991 | Phillips et al. | 516/69 |
| 5,731,101 | A * | 3/1998 | Sherif et al. | 429/102 |
| 5,994,283 | A * | 11/1999 | Durbut et al. | 510/242 |
| 6,479,446 | B1 * | 11/2002 | Sherry et al. | 510/238 |
| 6,984,605 | B2 * | 1/2006 | Hope et al. | 502/164 |
| 7,157,588 | B2 * | 1/2007 | Harmer et al. | 548/543 |
| 7,423,164 | B2 * | 9/2008 | Dai et al. | 556/14 |
| 2002/0015884 | A1 * | 2/2002 | Schmidt et al. | 429/188 |
| 2004/0002438 | A1 * | 1/2004 | Hawkins et al. | 510/417 |
| 2004/0005985 | A1 * | 1/2004 | Hope et al. | 502/224 |
| 2004/0077519 | A1 * | 4/2004 | Price et al. | 510/499 |
| 2004/0097755 | A1 | 5/2004 | Abbott et al. | |
| 2006/0090777 | A1 * | 5/2006 | Hecht et al. | 134/42 |
| 2006/0094615 | A1 * | 5/2006 | Hecht et al. | 510/179 |
| 2006/0094616 | A1 * | 5/2006 | Hecht et al. | 510/179 |
| 2006/0094620 | A1 * | 5/2006 | Jordan et al. | 510/286 |
| 2006/0094621 | A1 * | 5/2006 | Jordan et al. | 510/286 |
| 2006/0128996 | A1 * | 6/2006 | Vaultier et al. | 568/312 |
| 2006/0211871 | A1 * | 9/2006 | Dai et al. | 549/208 |
| 2006/0223995 | A1 * | 10/2006 | Uchimura et al. | 544/59 |
| 2007/0066834 | A1 * | 3/2007 | Harmer et al. | 548/518 |
| 2007/0099079 | A1 * | 5/2007 | Matsumoto et al. | 429/188 |
| 2008/0146849 | A1 * | 6/2008 | Dai et al. | 564/463 |
| 2008/0251759 | A1 * | 10/2008 | Kalb et al. | 252/183.13 |

FOREIGN PATENT DOCUMENTS

| | | | |
|---|---|---|---|
| WO | 98/55581 | A | 12/1998 |
| WO | 01/19507 | A | 3/2001 |
| WO | WO 03/051894 | A1 * | 6/2003 |
| WO | WO 2005/021484 | A3 * | 3/2005 |

OTHER PUBLICATIONS

International Search Report in connection with PCT/US2006/045783, Mar. 27, 2007, 1 page.

* cited by examiner

*Primary Examiner*—Mark Eashoo
*Assistant Examiner*—Jane L Stanley
(74) *Attorney, Agent, or Firm*—James F. McBride; Leonard W. Lewis; Steven W. Miller

(57) ABSTRACT

A process for making ionic liquids containing ion actives, which provide fabric treating benefits, surface treating benefits and/or air treating benefits. The ionic liquid is made from an ion active feedstock and an ionic liquid forming counterion feedstock, which preferably comprises another ion active.

10 Claims, No Drawings

PROCESS FOR MAKING AN IONIC LIQUID COMPRISING ION ACTIVES

CROSS REFERENCE TO RELATED APPLICATION

This application claims benefit of Provisional U.S. Application 60/740,513, filed Nov. 29, 2005.

FIELD OF THE INVENTION

The present invention relates to processes for making ionic liquids containing ion actives, which provide fabric treating benefits, surface treating benefits and/or air treating benefits. The ionic liquid is made from an ion active feedstock and an ionic liquid forming counterion feedstock, which preferably comprises another ion active.

BACKGROUND OF THE INVENTION

In recent years, ionic liquids have been extensively evaluated as environmental-friendly or "green" alternatives to conventional organic solvents for a broad range of organic synthetic applications. Ionic liquids offer some unique characteristics that distinguish them from conventional organic solvents, such as no effective vapor pressure, a broad liquid range, high polarity and charge density, hydrophobic or hydrophilic characteristics, and unique solvating properties.

Additionally, ionic liquids have been shown to be effective in applications where water-based chemistry can be problematic (for example, applications involving proton transfer or nucleophilicity), or in applications where certain coordination chemistry could have a damaging effect on the substrates involved.

Recently, ionic liquids and ionic liquid cocktails have found applications in consumer products (such as home care, air care, surface cleaning, laundry and fabric care formulations) and industrial products. Exemplary ionic liquid containing consumer products are described in US 2004/0077519A1. Moreover, compositions containing ionic liquids composed of an ion active and an ionic liquid forming counterion are described in U.S. patent application Ser. No. 60/624,128.

Some ingredients used in consumer products are supplied by the manufacturers in a highly concentrated form. In some cases, up to 70-90 weight % of the concentrate is the active ingredient. The concentrates may use organic solvents, such as isopropanol or ethanol, and sometimes a minor amount (up to 10%) of water and/or surfactants may be used. In the process of making consumer products, the active concentrates are diluted with water and optionally alcohols. The resulting products are distributed to the retailers and/or consumers. Dispersibility and viscosity characteristics of these active concentrates can pose serious problems for the processors. Surfactant active materials are available as aqueous dispersions only at relatively low concentrations. It is generally not possible to prepare such aqueous dispersions with more than about 30% of the active materials without encountering intractable problems of product viscosity and storage stability. Such problems are manifested in phase separated and/or non-pourable products, inadequate dispersion and/or poor dissolving characteristics under normal use conditions.

It is desirable to take advantage of the various unique characteristics of the ionic liquid to address these problems.

Conventionally, ionic liquids are prepared by mixing the raw materials in chlorinated solvents, such as methylene chloride or carbon tetrachloride. To recover the ionic liquid, a vacuum is applied to evaporate the chlorinated solvents. It is not practical to use this conventional process for industrial production for several reasons. Vacuum evaporation is slow and energy intensive. Special measures must be employed in order to meet the regulatory requirements for handling these solvents. It is difficult to remove the final traces of the chlorinated solvents from the ionic liquid, thus, rendering the resulting ionic liquids unsuitable for many consumer product applications.

Therefore, it is desirable to have a batch, or, preferably, a continuous process for making ionic liquid active concentrates in an aqueous carrier. It is also desirable that the continuous process makes aqueous concentrates with high active contents. Specifically, it is desirable to have aqueous ionic liquid active concentrates having proper viscosity and dispersibility so that the concentrates can be easily processed into consumer products. Additionally, it is desirable that the ionic liquid active concentrates have phase or dispersion stability suitable for shipping and storage.

SUMMARY OF THE INVENTION

In one of its several aspects, the present invention relates to a continuous process for preparing an ionic liquid active. In one example of the invention, the process comprises the steps of:

- introducing a first reactant comprising an organic amine oxide and a second reactant comprising an organic sulfate or organic sulfonate into the reaction zone of a reactor;
- introducing sufficient amount of a protic acid into the reaction zone such that the resulting reaction mixture has a pH less than about 5;
- circulating the reactants and the protic acid in the reaction zone at a circulation rate sufficient to provide intimate mixing of the first and second reactants and the protic acid to produce a product stream comprising said ionic liquid
- removing from the reaction zone said product stream comprising an ionic liquid of amine oxide cation and organic sulfate or organic sulfonate anion, and transferring the product stream into a separator;
- while controlling the introduction of the first and second reactant into the reaction zone and the removal of the product stream from the reaction zone such that the residence time of the reaction mixture in the reaction zone is sufficient to produce the ionic liquid;
- wherein the product stream is allowed to separate into an upper phase and a lower phase in said separator; and recovering a product comprising the ionic liquid, typically as the upper phase in said separator.

In another aspect of the invention, the same process can be employed to make ionic liquid active concentrates using betaine and an organic sulfate or an organic sulfonate as the feedstocks, wherein the protonation step employing an acid may be optional.

Other aspects of the invention, such as the manufacture of the aforesaid surfactant-based, concentrated ionic liquids without using halogenated solvents, as well as a new method of doing business which is afforded by the present invention, are also disclosed hereinafter.

DETAILED DESCRIPTION OF THE INVENTION

"Consumer product" as used herein refers to a material that is used by a user (i.e., a consumer) in, on or around their person, house (such as kitchen surfaces, bathroom surfaces, carpets, floors, windows, mirrors and countertops), car (such as automobile interiors, automobile exteriors, metal surfaces and windshields), other personal or household articles (such as dishware, fabrics, cookware, utensils, tableware and glassware), and air surrounding the user. "Consumer product composition" may also include the material used by institutional users (such as hotels, restaurants, offices) or by service providers (such as commercial dry cleaners and janitorial services). Consumer products, in the present context, can encompass any product which contains a surfactant.

"Industrial product" as used herein refers to a material that is used in a commercial process of making an article. Non-limiting examples include degreasing compositions for degreasing articles, such as metals; and textile treating compositions for processing and/or finishing textiles into fabric articles, such as garments, draperies. Industrial products, in the present context, can encompass any such product which contains a surfactant.

"Treating" as used herein refers to a composition or a process for cleaning, refreshing or maintaining the target surface or air. For example, "refreshing" includes the processes of removing the wrinkled or worn appearance from a fabric article, or imparting a pleasant odor to a fabric article, air, a soft surface or a hard surface. Cleaning also encompasses personal care such as bathing, shampooing, and the like.

"Surface", "target surface" or "treated surface" as used herein refers to an inanimate, non-biological surface, as well as biological surfaces such as skin and hair. Non-limiting examples of such surfaces are found in soft surfaces such as fabrics, fabric articles, textiles, fibers; and hard surfaces such as dishware, cookware, utensils, glassware, countertops, kitchen surfaces, bathroom surfaces, floors, windows, car interior and exterior, metal, and combinations thereof.

As used herein, the term "ion active" means the ion (cationic or anionic) form of an active capable of delivering benefits, for example, a fabric treating benefit, a surface treating benefit, and/or an air treating benefit, to a target substrate. The ion active retains the capability of delivering such benefits. As used herein, the terms "active" and "benefit agent" are interchangeable.

As used herein the term "ionic liquid active" means an ionic liquid composed of at least one ion active and at least one ionic liquid forming counterion.

The term "ionic liquid" as used herein refers to a salt that has a melting temperature of about 100° C. or less, or, in an alternative embodiment, has a melting temperature of about 60° C. or less, or, in yet another alternative embodiment, has a melting temperature of about 40° C. or less. In other embodiments, the ionic liquids exhibit no discernible melting point (based on DSC analysis) but are "flowable" at a temperature of about 100° C. or below, or, in another embodiment, are "flowable" at a temperature of from about 20 to about 80° C., i.e., the typical fabric or dish washing temperatures. As used herein, the term "flowable" means that the ionic liquid exhibits a viscosity of less than about 10,000 mPa·s at the temperatures as specified above. In a manufacturing context, the ionic liquids are pumpable.

It should be understood that the terms "ionic liquid", "ionic compound", and "IL" encompass ionic liquids, ionic liquid composites, and mixtures (or cocktails) of ionic liquids. The ionic liquid can comprise an anionic IL component and a cationic IL component. When the ionic liquid is in its liquid form, these components may freely associate with one another (i.e., in a scramble). As used herein, the term "cocktail of ionic liquids" refers to a mixture of two or more, preferably at least three, different and charged IL components, wherein at least one IL component is cationic and at least one IL component is anionic. Thus, the pairing of three cationic and anionic IL components in a cocktail would result in at least two different ionic liquids. The cocktails of ionic liquids may be prepared either by mixing individual ionic liquids having different IL components, or by preparing them via combinatorial chemistry. Such combinations and their preparation are discussed in further detail in US 2004/0077519A1 and US 2004/0097755A1. As used herein, the term "ionic liquid composite" refers to a mixture of a salt (which can be solid at room temperature) with a proton donor Z (which can be a liquid or a solid) as described in the documents immediately above. Upon mixing, these components turn into a liquid at about 100° C. or less, and the mixture behaves like an ionic liquid.

The ion active which forms the ionic liquid active is any ionic moiety which provides the desired treating benefit to a target object or a target surface. For example, within the present context, fabric treating refers generally to the cleaning, refreshing and/or care of any textile material or product, including, but not limited to, loose or free fibers, yarns (including threads), woven textiles, nonwoven textiles, knitted textiles, articles, and the like. Fabric articles include, but are not limited to, garments, components used in the manufacture of garments, carpets, upholstery, and the like. Additionally, such fabrics may be formed of any natural, man-made or synthetic material, or a combination thereof. Surface treating refers generally to the cleaning, refreshing and/or care of any non-fabric solid surface material, including, but not limited to, dishes, utensils and other items intended for food contact, and hard surfaces, for example, floors, counters, appliances, sinks, tubs, toilets, tiles and the like as well as personal hygiene. Air treating refers to cleaning and/or refreshing of environmental air, typically in an enclosed area.

Examples of suitable ion actives include, but are not limited to, the ion form of surfactants, bleaches, bleach activators, builders, antimicrobial agents, softeners, dyes, dye fixatives, optical brighteners, as described in U.S. patent application Ser. No. 60/624,128.

The ionic active may be anionic or cationic, as necessary for the desired benefit, and is typically derived from a salt or acid of a known benefit agent. For example, if a conventional benefit agent in salt form is of the formula $X^+Y^-$ and the anion $Y^-$ provides the desired fabric, surface or air treating activity, then the anionic form of the benefit agent is employed in the ionic liquid active. Examples of suitable anionic actives include, but are not limited to, anionic phosphate builders, anionic linear or branched alkyl sulfate and sulfonate detersive surfactants, linear or branched anionic alkylated and alkoxylated sulfate and sulfonate detersive surfactants, anionic perborate, percarbonate and peracid bleaches, and the like. Alternatively, if the cation $X^+$ of the conventional benefit agent in the salt form of the formula $X^+Y^-$ provides the desired fabric, surface or air treating activity, then the cationic form of the benefit agent is employed in the ionic liquid active. Examples of suitable cationic actives include, but are not limited to, cationic quaternary ammonium antimicrobial agents, cationic quaternary ammonium fabric softeners, cationic quaternary ammonium surfactants, and the like. Examples of suitable zwitterionic actives include, but are not limited to, amine oxide surfactants and betaine surfactants.

Additionally, a conventional nonionic or zwitterionic benefit agent can be converted to an ionic active by ionic functionalization with a cationic functional group (such as a trimethyl ammonium alkyl group) or an anionic functional group (such as a sulfate group). Alternatively, a zwitterionic benefit agent can be ionized by pH changes to the compositions to below the pKa of the zwitterionic active, resulting in a cationic form of the benefit agent.

The Ion Actives

Cationic ion actives can be derived from the following reactants:

(a) amine oxide detersive surfactants, including without limitation those having the formula:

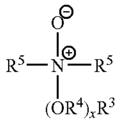

wherein $R^3$ is an $C_{8-22}$ alkyl, $C_{8-22}$ hydroxyalkyl, $C_{8-22}$ alkyl phenyl group, and mixtures thereof; $R^4$ is an $C_{2-3}$ alkylene or $C_{2-3}$ hydroxyalkylene group or mixtures thereof; x is from 0 to about 3; and each $R^5$ is independently an $C_{1-3}$ alkyl or $C_{1-3}$ hydroxyalkyl group or a polyethylene oxide group containing an average of from about 1 to about 3 ethylene oxide groups; or the $R^5$ groups are attached to each other, through an oxygen or nitrogen atom, to form a ring structure; and (b) betaine detersive surfactants, including without limitation those having the formula:

$$R—N^{(+)}(R^1)_2—R^2COO^{(-)}$$

wherein R is selected from the group consisting of C10-C22 alkyl, C10-C22 alkyl aryl and C10-C22 aryl alkyl, all of which are optionally interrupted by amido or ether linkages; each $R^1$ is a C1-C3 alkyl group; and $R^2$ is a C1-C6 alkylene group.

In one embodiment of the process of the present invention, amine oxide reactants are protonated to form the cationic ion actives in the resulting ionic liquid active. The resulting cationic ion active has the formula:

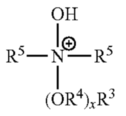

wherein $R^3$, $R^4$ and $R^5$ are as described above.

In another embodiment, betaines can be used as the reactants for forming the cationic ion active in the resulting ionic liquid active. The resulting cationic ion active (pronated form) has the formula:

$$R—N^{(+)}(R^1)_2—R^2COOH$$

wherein R, $R^1$ and $R^2$ are as described above.

In the process of the present invention, the following organic sulfate or sulfonates are exemplary surfactant-type reactants that can be paired with the above amine oxide or betaine reactants to form ionic liquid active.

(1) alkyl sulfates (AS), alkoxy sulfates and alkyl alkoxy sulfates, wherein the alkyl or alkoxy is linear, branched or mixtures thereof; furthermore, the attachment of the sulfate group to the alkyl chain can be terminal on the alkyl chain (AS), internal on the alkyl chain (SAS), i.e., secondary, or mixtures thereof: non-limiting examples include linear $C_{10}$-$C_{20}$ alkyl sulfates having formula:

$$CH_3(CH_2)_xCH_2OSO_3^-M^+$$

wherein x is an integer of at least 8, preferably at least about 10; and $M^+$ be H or alkaline metal or alkaline earth metal cations. For example, the reactants may comprise Na+, K+, Mg++, and the like; or linear $C_{10}$-$C_{20}$ secondary alkyl sulfates having formula:

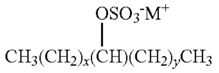

wherein x+y is an integer of at least 7, preferably at least about 9; x or y can be 0; and $M^+$ is H or alkaline metal or alkaline earth metal cations. The reactants may comprise $H^+$, Na+, K+, Mg++, and the like; or C10-C20 secondary alkyl ethoxy sulfates having formula:

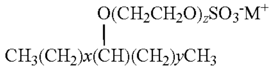

wherein x+y is an integer of at least 7, preferably at least about 9; x or y can be 0; z is from about 1.2 (Avg.) to about 30; and $M^+$ is H or an alkaline metal or alkaline earth metal cation. For example, the betaine salts may comprise Na+, K+, Mg++, and the like; non-limiting examples of alkoxy sulfates include sulfated derivatives of commercially available alkoxy copolymers, such as Pluronics® (from BASF);

(2) mono- and di-esters of sulfosuccinates: non-limiting examples include saturated and unsaturated $C_{12-18}$ monoester sulfosuccinates, such as lauryl sulfosuccinate available as Mackanate LO-100® (from The McIntyre Group); saturated and unsaturated $C_6$-$C_{12}$ diester sulfosuccinates, such as dioctyl ester sulfosuccinate available as Aerosol OT® (from Cytec Industries, Inc.);

(3) alkyl aryl sulfonates, non-limiting examples of which include tosylate, alkyl aryl sulfonates having linear or branched, saturated or unsaturated $C_8$-$C_{14}$ alkyls; alkyl benzene sulfonates (LAS) such as $C_{11}$-$C_{18}$ alkyl benzene sulfonates; and sulfonates of benzene;

(4) alkyl glycerol ether sulfonates having 8 to 22 carbon atoms in the alkyl moiety;

(5) mid-chain branched alkyl sulfates (HSAS), mid-chain branched alkyl aryl sulfonates (MLAS) and mid-chain branched alkyl polyoxyalkylene sulfates; non-limiting examples of MLAS are disclosed in U.S. Pat. Nos. 6,596,680; 6,593,285; and 6,202,303;

(6) sulfated and sulfonated oils and fatty acids, linear or branched, such as those sulfates or sulfonates derived from potassium coconut oil soap available as Norfox 1101® from Norman, Fox & Co. and potassium oleate from Chemron Corp., as well as paraffin sulfonates;

(7) fatty acid ester sulfonates having the formula:

$$R_1—CH(SO_3^-)CO_2R_2$$

wherein $R_1$ is linear or branched $C_8$ to $C_{18}$ alkyl, and $R_2$ is linear or branched $C_1$ to $C_6$ alkyl.

Organic sulfates and sulfonates are preferred for use herein.

The Process

The present invention encompasses, but is not limited to, a continuous process for making an ionic liquid active. The process is described in detail by referring to one specific embodiment of the continuous process, wherein the ionic liquid active is composed of amine oxide and alkyl sulfate.

However, it is understood that the process can be used to make other ionic liquid actives composed of any combination of those ion actives described above.

Furthermore, the exemplified continuous process of the present invention may be used to make other ionic liquid actives composed of, for example, a cationic fabric softener, a cationic antimicrobial, or a cationic surfactant with an anionic bleach activator or an anionic surfactant. In one embodiment, the ionic liquid active is composed of quaternary ammonium cations and alkyl sulfonate anions. Of course, the process for making some ionic liquid active may not require the protonation step.

A general embodiment of this aspect of the present invention includes the steps of continuously feeding an amine oxide and an alkyl sulfate into a reaction zone where intimate mixing of the reactants take place. The reactor can be a stirred tank reactor, a plug flow reactor with static mixers or a recirculating loop reactor. A proton donor, such as sulfuric acid, can be fed directly into the reaction zone to protonate the amine oxide, thereby producing the ionic liquid active. A product stream containing the ionic liquid active is withdrawn from the reaction zone and fed into a phase separator. The ionic liquid active can easily be recovered from the top layer of the phase separator.

Once steady-state conditions are established in the reactor, the rate of introduction of the reactants (amine oxide and alkyl sulfate) into the reaction zone is controlled to be approximately the same as the rate of withdrawal of the product stream from the reaction zone such that the residence time of the reaction mixture and/or the reactants in the reaction zone is maintained at a constant. Other variables in the reaction zone, such as temperature, agitation, and circulation rate, are also preferably maintained at a constant.

In this embodiment, to achieve desired ionic liquid active by the continuous process of the present invention, amine oxide and alkyl sulfate are introduced into the continuous reactor at a molar ratio to satisfy the stoichiometry, typically a molar ratio of about 1:1, or about 0.9:1, or from about 1.2:1. The amine oxide and alkyl sulfate feedstocks may be in the form of aqueous concentrates. A typical amine oxide feedstock may be a pumpable aqueous concentrate, having about 20 to about 40 wt % amine oxide. In one embodiment of the present invention, the feedstock contains about 30 wt % surfactant-type (eg. $C_{10}$-$C_{20}$ dimethyl amine oxide) amine oxide in water and has a viscosity of about 150 centipoises (150 mPa*s). Exemplary amine oxide concentrates are commercially available from Stepan Lonza or Kao, under the tradenames Ammonyx®, Barlox® and Amphitol®. A typical alkyl sulfate feedstock may be an aqueous concentrate having about 20-70 wt %, preferably about 30-60 wt % alkyl sulfate. In one embodiment of the present invention, the feedstock contains about 50-70 wt % alkyl sulfate in water and has a viscosity of greater than about 500 centipoises (500 mPa*s). Exemplary alkyl sulfate concentrates are commercially available from Stepan or Kao under the tradenames Stepanol® or Emal®. In addition to water, the feedstocks may also contain adjunct solvents, such as methanol, ethanol, and other lower (C3-C6) alcohols, and such solvents (preferably non-halogenated) can be employed to reduce the viscosity of the system.

A proton donor is also introduced into the reaction mixture to protonate the amine oxide, thereby converting it into the amine oxide cation. Exemplary proton donors are protic acids, including but not limited to, sulfuric acid, halogen-based acids (such as HF, HCl, HBr, HI, $HClO_4$), nitric acid, phosphoric acid, trifloroacetic acid or p-toluenesulfonic acid (PTSA). The amount of proton donor in the reaction mixture should be sufficient to maintain the reaction mixture at a pH of less than about 5, preferably from about 3 to about 5, and more preferably from about 3.5 to about 4.

The continuous reactor, especially the reaction zone, is maintained at above ambient temperature, preferably at a temperature from about 40° C. to about 99° C., or from about 50° C. to about 85° C., such that the ionic liquid is in its liquid form. The amine oxide and alkyl sulfate feedstocks may be heated to above ambient temperature, preferably to a temperature from about 50° C. to about 70° C. or a temperature equal to the reactor temperature. Preheating of the feedstocks reduces their viscosities to facilitate transfer into the reaction zone and minimizes the temperature drop at the reaction zone. Preheating of feedstocks and heating of the reactor can be done by any known means, for example, through a heat exchanger.

To achieve desirable results of the invention in optimal fashion, the reactor configuration, the properties (such as viscosity) of the reaction mixture and the volumetric flow rate may be such that turbulent flow is maintained in the reaction zone. In one embodiment, the reactor system operates at a Reynolds number of about 10,000. In other embodiments, the reactor system operates at a Reynolds number of at least about 2000, preferably from about 5000 to about 50,000, in the reaction zone.

In one embodiment, the residence time (simply measured as input vs. output over time, at steady-state) of the reaction mixture in the reactor is from about 5 seconds to about 10 hours or from about 0.1 minute to about 30 minutes. In another embodiment, the residence time of the reaction mixture in the reactor is from about 30 seconds to about 15 minutes. Residence time can also be determined by the time necessary for a marker (e.g., dye slug or radioactive tracer) to pass through the reactor.

It will be appreciated that similar operating parameters can be used in batch processes within the scope of the present invention, as disclosed hereinafter.

To recover the resulting ionic liquid active from the reaction stream, the reaction stream is withdrawn from the continuous reactor and fed into a phase separator. The reaction stream is allowed to separate via interfacial tension and/or gravity. In a typical arrangement, the reaction stream is fed into the separator near the midpoint thereof and the separator is provided with two discharge tubes. The first discharge tube joins the separator at a place adjacent to or at the top of the separator. The second discharge tube is connected to a place at or near the bottom of the separator and extends upward along the outside of the separator to maintain the height of the bottom layer in the separator at a desired level just below the place where the separator and the first discharge tube meet. The ionic liquid actives concentrate in an upper separate layer on top of the lower aqueous layer and the upper layer is withdrawn from the phase separator through a discharge tube into a storage tank. The top layer recovered from the separator may contain water and adjunct solvent as well as the ionic liquid active. In one embodiment, the recovered top layer contains from about 50 to about 100 wt %, or from about 60 to about 90 wt % ionic liquid actives. In another embodiment, the recovered top layer comprises from about 0 to about 35 wt % water or from about 10 to about 25 wt % water. In another embodiment, the recovered top layer comprises from about 0 to about 15 wt %, or from about 5 to about 12 wt % alcohol, e.g., methanol and/or ethanol Representative ionic liquid actives are produced by this continuous process and recovered as the top layer from the separator or batch reactor. They exhibit the approximate properties as shown below.

| EXAMPLE | Ionic liquid active | wt % IL active | wt % water | wt % EtOH | Complete melt temperature (° C.)[1] | Solidification onset temperature (° C.)[1] |
|---|---|---|---|---|---|---|
| 1 | IL Active (A) | 72 | 22 | 6 | 20 | −6 |
| 2 | IL Active (A) | 69.7 | 23.3 | 7.0 | 36 | 11 |
| 3 | IL Active (A) | 66.5 | 21.1 | 12.4 | 35 | 10 |
| 4 | IL Active (A) | 61.0 | 30.8 | 8.2 | 28 | −9 |
| 5 | IL Active (B) | 61.3 | 29.2 | 9.5 | 34 | 20 |

| EXAMPLE | Ionic liquid active | Viscosity (Pa-s)[2] | | | | |
|---|---|---|---|---|---|---|
| | | 30° C. | 35° C. | 40° C. | 60° C. | 80° C. |
| 1 | IL Active (A) | ND | ND | 0.39 | 0.052 | 0.027 |
| 2 | IL Active (A) | 1.99 | 0.15 | 0.045 | 0.026 | 0.016 |
| 3 | IL Active (A) | 0.060 | 0.040 | 0.024 | 0.015 | 0.015 |
| 4 | IL Active (A) | 0.060 | 0.060 | 0.039 | 0.015 | 0.015 |
| 5 | IL Active (B) | ND[3] | ND[3] | ND[3] | 0.021 | 0.021 |

IL Active (A) is composed of dodecyl dimethyl amine oxide and Isalchem 123 ® sulfate, which is derived from Isalchem 123 ® alcohol (available from Sasol Chemical Industries, Ltd., Johannesburg, South Africa) via sulfation processes known in the art.
IL Active (B) is composed of dodecyl dimethyl amine oxide and Lial 123 ® sulfate, which is derived from Lial 123 ® alcohol (available from Sasol Chemical Industires, Ltd., Johannesburg, South Africa) via sulfation processes known in the art.
[1]All measurements are made on a Perkin Elmer Pyris 1 DSC system. Samples are heated from room temperature to 75° C. at 10° C. per minute, cooled to −50° C. at 5° C. per minute; held at −50° C. for 60 minutes, then heated to 75° C. at 10° C. per minute. The end of the first order transition on the second heating trace is reported as the "complete melting temperature". The onset of the first order transition on the cooling trace is reported as the "solidification onset temperature".
[2]All measurements are made on a TA Instruments AR 1000 cone and plate viscometer. A 40 mm diameter, 2° angled, stainless steel cone is used. All experiments are run under the conditions: a temperature ramp up rate of 5° C./min and a constant shear stress of 5 Pa. The viscosity of the sample is reported from 30 to 80° C.
[3]ND indicates that the sample was too viscous to obtain data under the test conditions.

The ionic liquid active concentrates prepared by the continuous process of the prevent invent ion provide higher active content than the aqueous active concentrates currently available from suppliers. Moreover, these ionic liquid active concentrates exhibit a desirable viscosity profile such that they can be easily formulated into consumer products employing standard processing equipment such that it is unnecessary to use high temperature or high pressure pumps. Additionally, these ionic liquid active concentrates are phase stable under typical storage and shipping conditions.

While the foregoing disclosure describes a preferred continuous process for the manufacture of the concentrated, surfactant-based ionic liquids herein, it is to be understood that the process herein can also be conducted batch-wise.

Indeed, when considered in its broader aspect, an important feature of the present process is that it can be conducted in the absence of halogenated hydrocarbons, such as those typically used in the manufacture of ionic liquid compositions. As will be readily appreciated by those of skill in the art, avoiding the need to use and recover halogenated hydrocarbons in a large-scale manufacturing process greatly simplifies plant design and operation.

Thus, the present invention also encompasses:

A process for preparing an ionic liquid comprising:

a.) preparing a reaction mixture by mixing a protonated amine oxide, protonated betaine, or mixtures thereof with an organic sulfate or an organic sulfonate, or mixtures thereof, in the presence of water or water-alcohol, but in the absence of halogenated hydrocarbon solvents, for a time sufficient to allow the formation of the ionic liquid;

b.) allowing the reaction mixture to separate into an upper phase and a lower phase by discontinuing the mixing; and c.) retaining the upper phase comprising said ionic liquid.

The various reaction conditions noted above can also be used in this more general process afforded by the present invention.

Moreover, it is to be understood that the production of surfactant-based ionic fluids in the present manner affords new opportunities for cost savings to the manufacturer of products containing one or more surfactant components.

In principle, a manufacturer of surfactant-containing products for distribution in widely-scattered, even global, regions would prefer to source the surfactant feedstock from some, more-or-less, centralized supply site, or sites, and then use the surfactant feedstock to formulate the finished product for local distribution and sale. This centralized sourcing would also allow the locally-formulated finished product to be tailored for local needs, habits and practices. For example, the formulation of laundry detergents in regions with hard water may require different adjunct ingredients than those formulated in regions with soft water, even though the nature of the surfactants, themselves, may be the same in both instances. By using such a "central supply—local formulation" system, localized needs could be met simply and economically.

The problem with this business plan is that surfactants often exhibit complex phase behaviors, such that they must be shipped as relatively dilute compositions. As a result, much of the shipping costs incurred are due to the presence of water in the surfactant feedstock.

Especially in regard to amine oxide surfactants, the removal of water from surfactant feedstocks is not a trivial matter. Due to their phase behavior, even the most concentrated aqueous surfactant "pastes" have heretofore comprised only about 30%-40% by weight surfactant (the balance mainly comprising water) in order to remain pumpable in the manufacturing plant. Various solvents can be added to decrease the viscosity of high concentrates, but at added expense. Indeed, at concentrations of greater than about 40%, by weight, in water, amine oxide surfactant/water systems are essentially intractable under normal plant operating conditions. Moreover, attempting to reduce the viscosity of concentrated amine oxide/water pastes by heating is inadvisable, since the amine oxide can begin to decompose at temperatures as low as 100° C.

As can be seen from the disclosures herein, the present invention provides more highly concentrated (e.g., as low as 10%-30% water, by weight), yet pumpable, surfactant feedstocks that afford the opportunity to secure considerable savings in shipping costs. Accordingly, the aforesaid business plan now becomes viable. The invention herein thus also encompasses:

A method for achieving cost-savings in the manufacture of products comprising one or more surfactant components, said method comprising:

a.) establishing at least one supply site for converting said one or more surfactant components into a surfactant-based ionic liquid;

b.) establishing one or more receptor sites remote from said supply site for receiving shipments of said ionic liquid from said supply site;

c.) shipping said ionic liquid from a supply site to said one or more receptor sites; and d.) employing said ionic liquid at said one or more receptor sites to manufacture said products.

Attention is further directed to the ionic liquid of Examples 1-5. As noted in the above tables, ionic liquids prepared from dodecyl dimethyl amine oxide and Isalchem 123® sulfated alcohol surprisingly have a preferred viscosity profile over ionic liquids prepared from Lial 123® sulfated alcohol.

While not intending to be limited by theory, it is now hypothesized that this improvement in viscosity profile may be due to the fact that Lial 123® is made from a feedstock which comprises only about 45%, by weight, of secondary alcohols, whereas the Isalchem 123® alcohol feedstock comprises about 95%, by weight, secondary alcohol. Of course, this results in 45% vs. 95% by weight secondary alkyl sulfates, respectively.

Accordingly, the present invention also encompasses, as a preferred embodiment, ionic liquids comprising an organic amine oxide moiety (especially $C_{12}$-$C_{14}$ dimethyl amine oxide) in combination with a sulfated alcohol moiety derived from a secondary alcohol and comprising more than 45%, preferably about 50% to about 100%, most preferably at least about 95%, by weight, of sulfated secondary alcohol (especially secondary $C_{12}$-$C_{13}$ alcohol). The ionic liquids may further comprise the aforesaid low levels of water or water-alcohol (especially ethanol). Such preferred ionic liquids have a desirable viscosity profile, as noted above, and are free of halogenated solvents.

This newly-recognized technical effect further supports the broader aspect of the invention, to-wit: Use of an alkyl sulfate derivative of a secondary alcohol feedstock, said alcohol feedstock comprising greater than 45%, by weight, of secondary alcohol substituents, to prepare an ionic liquid having an improved viscosity profile (i.e., pumpable) at temperatures of 80° C., and below, preferably without using halogenated hydrocarbon solvents.

All documents cited are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A continuous process for preparing an aqueous concentrate comprising from about 10% to about 30%, by weight, of water and 70% to 90% by weight of an active ingredient which is an ionic liquid having an amine oxide cation, comprising the steps of:

introducing a first reactant comprising an organic amine oxide and a second reactant feedstock, said feedstock comprising 50% to 100%, by weight, of a secondary alkyl sulfate, into the reaction zone of a reactor;

introducing a protic acid into the reaction zone such that the resulting reaction mixture has a pH less than about 5;

circulating the first and second reactants and the protic acid in the reaction zone at a circulation rate to establish a Reynolds number of at least about 2000 of the first and second reactants and the protic acid to produce a product stream comprising said ionic liquid;

removing from the reaction zone said product stream and transferring the product stream into a separator, wherein the product stream comprises an ionic liquid which comprises an amine oxide cation and a secondary alkyl sulfate anion;

while controlling the introduction of the first and second reactants into the reaction zone and the removal of the product stream from the reaction zone such that the residence time of the reaction mixture in the reaction zone is from about 0.1 minute to about 30 minutes to produce the ionic liquid; and allowing the product stream to separate into an upper and lower phase and recovering the ionic liquid from the upper phase, said process being carried out without using halogenated solvents.

2. The process according to claim 1 wherein the first reactant in protonated form comprises amine oxide cation having the formula:

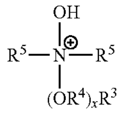

wherein $R^3$ is a linear, branched or combination of linear and branched $C_{8-22}$ alkyl, $C_{8-22}$ hydroxyalkyl, or $C_{8-22}$ alkyl phenyl group; $R^4$ is an $C_{2-3}$ alkylene or $C_{2-3}$ hydroxyalkylene; x is from 0 to about 3; and each $R^5$ is an $C_{1-3}$ alkyl or $C_{1-3}$ hydroxyalkyl group or a polyethylene oxide group containing an average of from about 1 to about 3 ethylene oxide groups; optionally, the $R^5$ groups may be attached to each other, through an oxygen or nitrogen atom, to form a ring structure, and wherein said second reactant is a feedstock comprising at least about 95%, by weight, of secondary $C_{12}$-$C_{13}$ alcohol sulfate.

3. The process according to claim 1 wherein the circulation rate establishes a Reynolds number of about 5000 to about 50,000.

4. The process according to claim 1 wherein the reaction zone is heated to above ambient temperature.

5. The process according to claim 1 wherein the process optionally comprises adding an organic solvent to the reaction zone such that the resulting reaction mixture has a viscosity from about 0.01 to about 0.07 Pa*s at 60° C.

6. The process according to claim 5 wherein the organic solvent is selected from the group consisting of C1-C8 alcohols, C2-C8 diols, C2-C8 glycols, and mixtures thereof.

7. The process according to claim 1 wherein the protic acid is selected from the group consisting of sulfuric acid, halogen-based acids, nitric acid, phosphoric acid, trifloroacetic acid or p-toluenesulfonic acid, and mixtures thereof.

8. The process according to claim 1 wherein the pH of the reaction mixture ranges from about 2 to less than about 5.

9. The process according to claim 1 wherein the molar ratio of amine oxide to secondary alkyl sulfate is about 1:1.

10. The process according to claim 1 wherein the amine oxide and the secondary alkyl sulfate feedstock are preheated to a temperature from about 50° C. to about 70° C.

* * * * *